Nov. 18, 1930. H. E. CHIPMAN 1,781,892
CONTROL SWITCH
Filed Sept. 18, 1926 3 Sheets-Sheet 1

INVENTOR
Harry E. Chipman
BY
his ATTORNEY

Nov. 18, 1930.  H. E. CHIPMAN  1,781,892
CONTROL SWITCH
Filed Sept. 18, 1926  3 Sheets-Sheet 2

INVENTOR
Harry E. Chipman
BY
his ATTORNEY

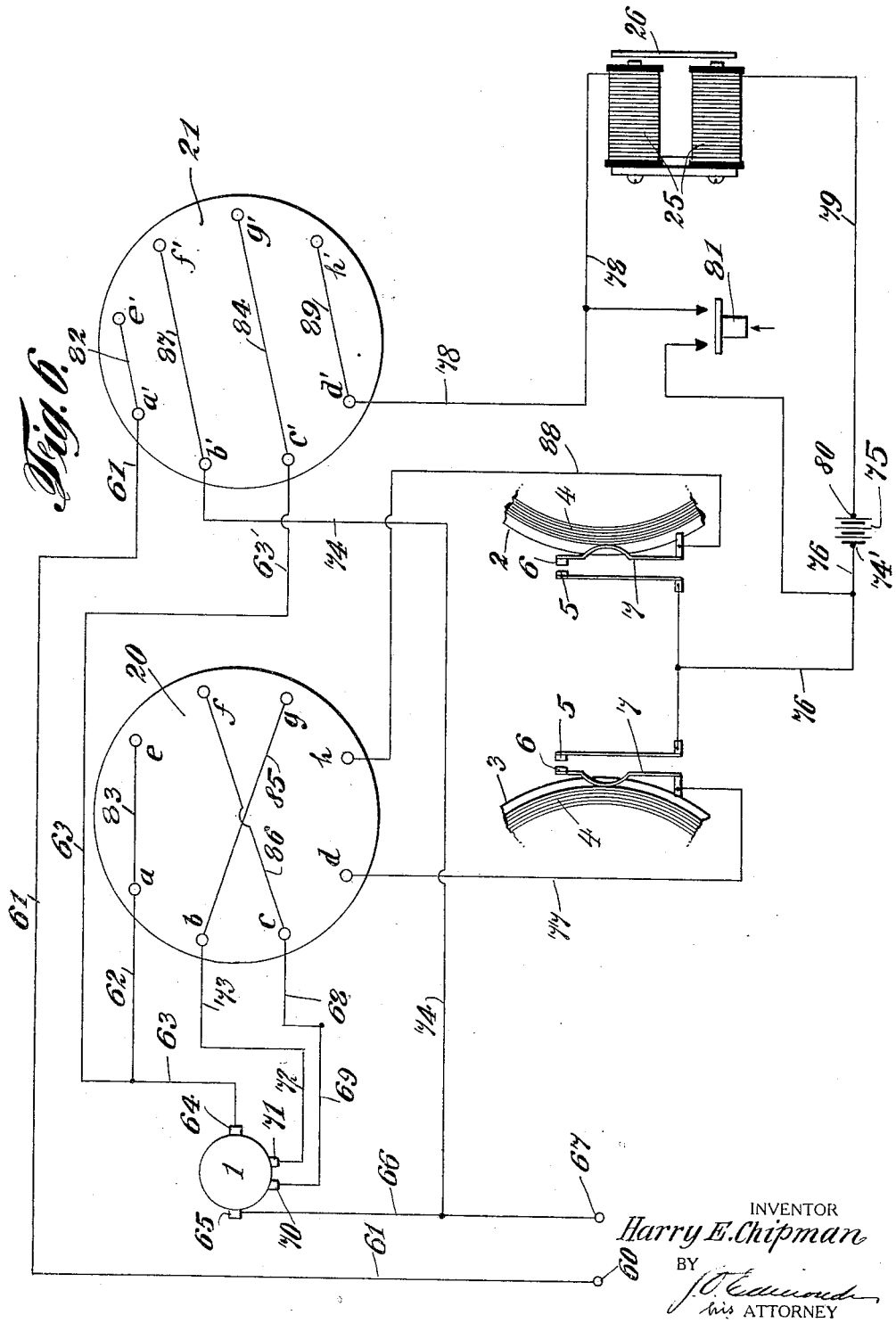

Patented Nov. 18, 1930

1,781,892

UNITED STATES PATENT OFFICE

HARRY E. CHIPMAN, OF SPRINGFIELD, MASSACHUSETTS, ASSIGNOR, BY DIRECT AND MESNE ASSIGNMENTS, TO ANDREW LE ROY CHIPMAN, OF NEW YORK, N. Y.

CONTROL SWITCH

Application filed September 18, 1926. Serial No. 136,246.

This invention relates to control switches, and to means for operating the switch to control electrical circuits. More particularly, this invention relates to a control switch especially well suited for use in controlling electric circuits to start, stop and reverse an electric motor.

The principal object of my invention is to improve upon the switch and the controlling means therefor disclosed in Patent No. 1,480,993, granted to me January 15, 1924, for electric motor circuit control.

A further object of this invention is to provide a switch adapted to be used for controlling electric motor circuits, and a switch of simple and durable construction; one which is easy and positive in action, and is not apt to arc at the contacts.

My objects also include the provision of a switch of the character described, and operating means therefor, whereby the control circuit to an electrical machine, such as an electric motor, may be closed or opened or reversed at any time by the operator, and whereby the circuit may be opened automatically at a predetermined time by an element driven by or operated on by the machine.

Other objects of this invention will be in part obvious and in part pointed out hereinafter.

In accordance with my invention, I interpose between the machine to be controlled and a suitable source of electrical power therefor, two flat terminal carrying plates, placed face to face, one plate being movable (preferably rotatable) over the other into any one of three different positions. The terminals are so arranged on the plates that the circuit to the machine may be broken or may be closed to start or to reverse the motor by merely making a proper adjustment of the movable plate. Means are provided for latching the movable plate in any one of said three positions, and for releasing the plate so that it becomes restored automatically by resilient means to the position for stopping the motor.

In order that a clearer understanding of my invention may be had, attention is hereby directed to the accompanying drawings, forming a part of this application and illustrating certain possible embodiments of my invention.

Figure 1:
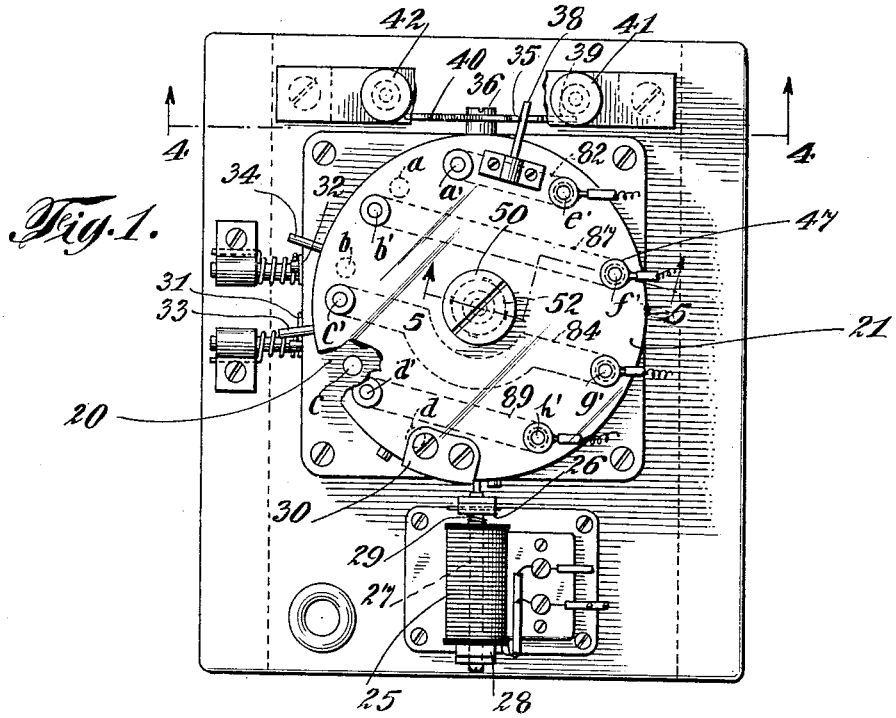
Figure 2:
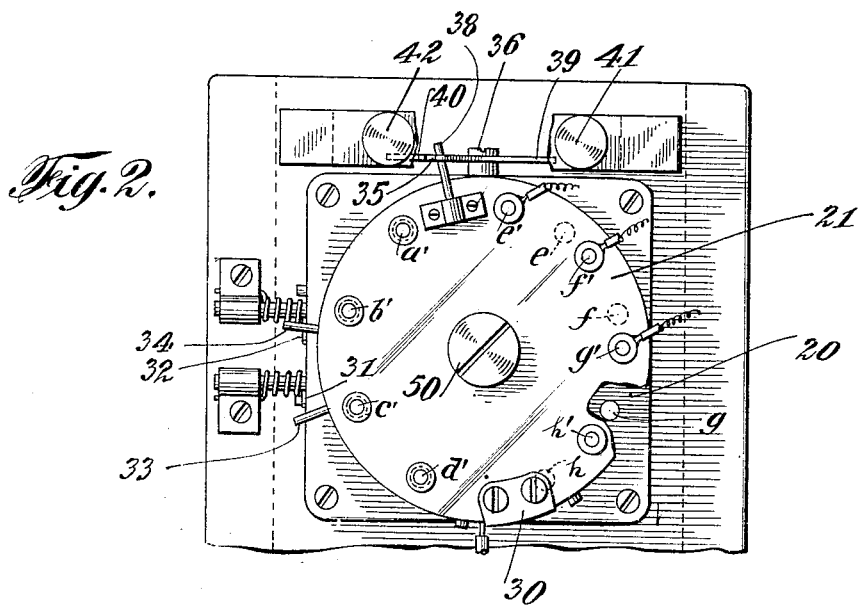
Figure 3:
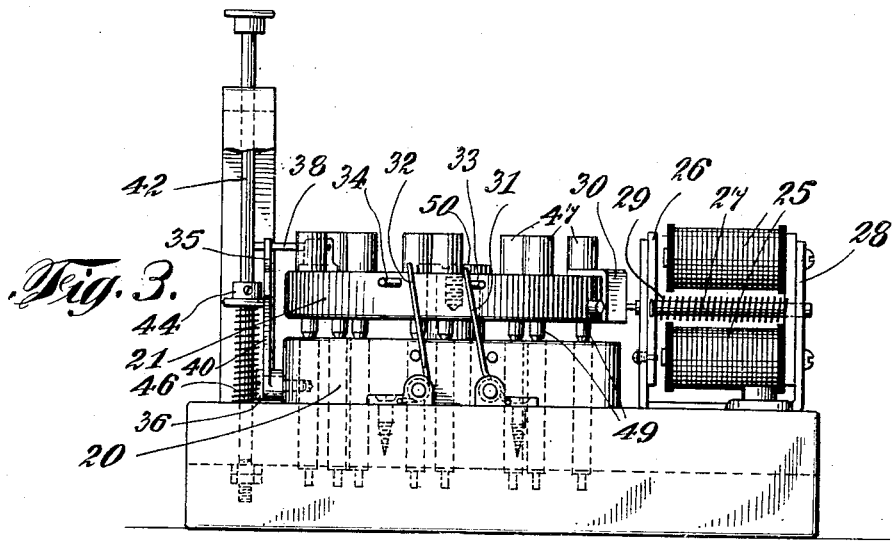
Figure 4:
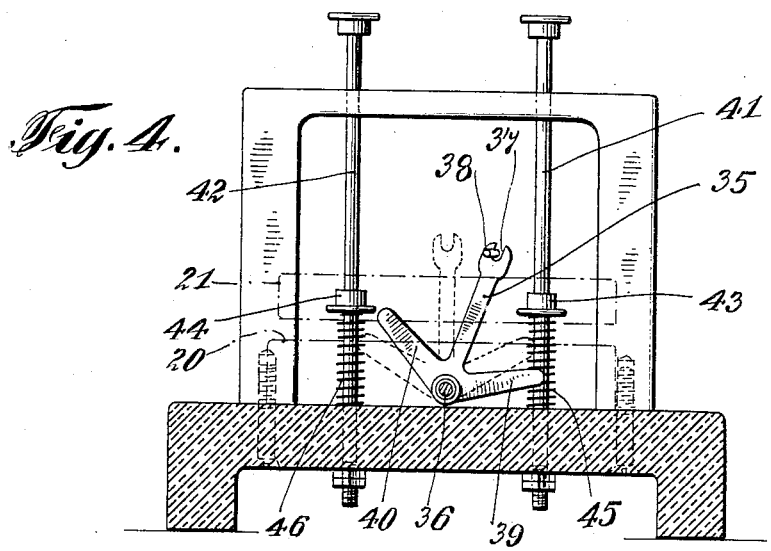
Figure 5:
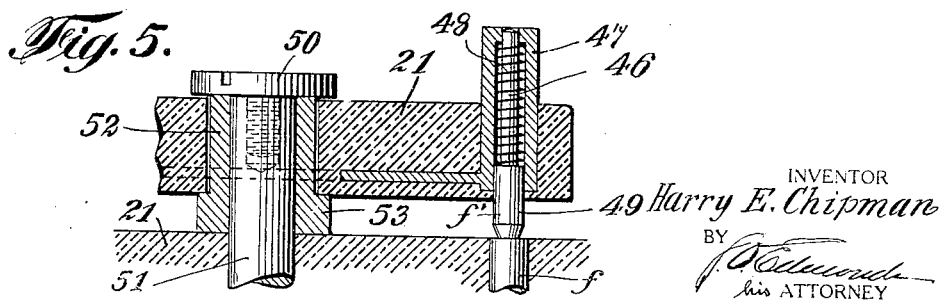

In the drawings, Fig. 1 is a top view of the control switch and associated operating mechanism embodying my invention, a fragment of the rotatable plate being broken away; Fig. 2 is a similar view to Fig. 1, showing the switch adjusted to reverse the circuit; Fig. 3 is a side view of the same; Fig. 4 is a sectional view of the same, and is taken on the line 4—4 of Fig. 1, showing in full lines the position of certain of the parts when the circuit is closed, and showing in dash lines the position of said parts when the switch is set to open the circuit; Fig. 5 is an enlarged sectional view of a detail of the construction, and is taken on the broken line 5—5 of Fig. 1; and Fig. 6 is a diagrammatical view, showing the control system associated with an electric motor and representations of apparatus driven by the motor and bringing out the wiring diagram.

Similar reference characters refer to similar parts throughout the several views of the drawings.

For purposes of illustration, I have shown my invention applied to an electric motor 1 which drives reels for motion picture film, so that the film may be wound back and forth from one reel to another, as is illustrated and described in Patent No. 1,480,992, granted to me January 25, 1924, for talking picture transfer mechanism. In the present application, these reels are diagrammatically shown at 2 and 3 and the film designated 4. Adjacent each reel 2 and 3 is a stationary contact 5 and a movable contact 6, which is mounted on a spring finger 7, so that the contact 6 remains separated from the contact 5 until a certain amount of film has been wound up on one of the reels; at which time the film on the reel will engage the finger 7 and cause the contacts 5 and 6 adjacent that reel to come together. The closing of either pair of contacts will cause the motor which drives the reels to stop, as will be described hereinafter.

The switch for controlling the operation of the motor 1, and consequently the rotation of the reels 2 and 3, comprises a fixed plate 20 and a movable plate 21 placed together. These plates have electrical terminals mounted thereon. The terminals on plate 20 are designated $a$, $b$, $c$, $d$, $e$, $f$, $g$ and $h$, and the complementary terminals on plate 21 are designated, respectively, $a'$, $b'$, $c'$, $d'$, $e'$, $f'$, $g'$ and $h'$. In the normal position of the movable plate with respect to the stationary plate, none of the contacts of one plate engages the contacts of the other plate. Means are provided for rotating the movable plate in either direction from normal position, to bring the contacts $a'$, $b'$, $c'$ and $d'$ into engagement with contacts $a$, $b$, $c$, and $d$, or to bring the contacts $e'$, $f'$, $g'$ and $h'$ into engagement with the contacts $e$, $f$, $g$ and $h$. Means are also provided for latching the movable plate in either of said adjusted positions. Means are also provided for restoring the movable plate into normal position when released by the latching means.

The latching means includes a relay comprising magnet coils 25 and an armature 26, which carries a pin 27 slidably supported in suitable brackets 28. A coil spring 29 surrounding the pin 27 and compressed between the armature 26 and the rear bracket yieldingly holds the armature 26 forward. The end of pin 27 projects through the forward bracket and is adapted, under the action of spring 29, to latch against either side of a lug or plate 30, which is secured to the periphery of the movable plate 21. On the base or frame of the switch are mounted two upwardly extending spring fingers 31 and 32, which extend between two spaced pins 33 and 34 on the periphery of the plate 21. These springs and pins are so arranged that when the movable plate has been adjusted to bring one set of contacts, such as $a'$, $b'$, $c'$ and $d'$, into engagement with the contacts $a$, $b$, $c$ and $d$, spring finger 31 will be tensioned against the pin 33, to cause the movable plate to rotate into normal position as soon as the latch pin 27 has been disengaged from the side of the lug 30. Similarly, when the plate 21 has been adjusted in the reverse direction, spring finger 32 will be tensioned against pin 34, to cause rotation of the movable plate into normal position as soon as the latch pin 27 has been disengaged from the corresponding side of lug 30.

Means are provided for adjusting the movable plate in either direction out of normal position. As shown, an anchor-shaped lever 35 is pivoted on a shaft 36 adjacent the periphery of the movable plate 21. The upwardly extending center arm of this lever has a slot 37, which engages a pin 38 carried on the periphery of the plate 21, so that the plate will be rotated in accordance with the rocking of the lever 35. Adjacent the ends of the oppositely extending arms 39 and 40 of the lever are positioned plungers 41 and 42, which are provided with collars 43 and 44. The plungers are normally held in upward position by means of coil springs 45 and 46, which are compressed between the collars and the frame or base of the switch. When the lever is in normal position, that is, when the upright arm thereof is vertical, the movable plate 21 is in normal position. Now, by depressing either plunger 41 or 42, the collar of the actuated plunger will engage the adjacent arm of the lever and cause the lever to be tilted and the plate 21 to be rotated in the corresponding direction. The amount of rotation given to the movable plate by this movement will bring one set of contacts or the other in engagement with the corresponding set of contacts on the stationary plate 20. The amount of movement given to the movable plate 21 by means of the plungers will move the lug 30 sufficiently to cause the latch pin 27 to engage against one side or the other thereof and prevent return movement of the movable plate until the latch pin has been retracted, as by the coils of the relay being energized. Preferably, the arrangement of the plungers and lever is such that when the lever is inclined toward one plunger, the collar of the other plunger will escape the adjacent arm of the lever, so that the plunger may be freely depressed without tending to restore the movable plate into normal position.

In order that good electrical contact be obtained between the terminals on the plates, the terminals on one plate, for instance, on the upper plate 21, are provided with stems 46 and are seated in tubular housings 47, and are under continuous outward pressure by means of coil springs 48, which encircle the stems of the terminals and are compressed between the rear of the housing and the head 49 of the terminal.

The movable plate 21 may be rotatably secured in place by means of a headed screw 50, which engages a stud or shaft 51, about which the plate may revolve. The bushing 52 may be interposed between the shaft 51 and the plate 21 and provided with a shoulder 53, which maintains proper spacing between the plates 20 and 21.

The circuits and the operation of the switch will now be described:

As before stated, when the plate 21 is in normal position, none of the terminals thereon contacts any of the terminals on the plate 20. In this adjustment, the motor is at rest and no current is passing through the coils 25 of the relay. To start the motor rotating in one direction or the other, it is merely necessary to depress the corresponding plunger 41 or 42. If plunger 42 is depressed, the terminals $a'$, $b'$, $c'$ and $d'$ will be brought into contact with the terminals $a$, $b$, $c$ and $d$. The circuit will be as follows: From one terminal 60 of a suitable source of supply through conductor 61 to terminal $a'$ across to terminal $a$, thence through conductors 62 and 63 to one pole 64 of the motor armature, and thence from the other pole 65 of the motor armature through conductor 66 to the opposite terminal 67 of the source of supply. Meanwhile, current will also pass through conductor 63' to terminal $c'$ and terminal $c$, through conductors 68 and 69 to the field terminal 70 of the motor, and from the field terminal 71 of the motor through conductors 72 and 73 to terminal $b$ across to terminal $b'$, and thence through conductors 74 and 66 to the opposite terminal 67 of the source of supply.

We will assume that in this adjustment of the switch, the motor drives the reel 3 to wind film thereon, in which case the contact fingers 5 and 6 will be brought together when a predetermined amount of film has been wound on this reel. The relay will then be automatically energized, to cause the switch to be restored to normal position as soon as these fingers meet in accordance with the following circuit: Current will flow from one terminal 74' of a suitable source of low voltage current for the relay, such as a battery 75, through conductor 76 to contact 5, thence through contact 6 through conductor 77 to terminal $d$, thence through terminal $d'$ and conductor 78 to the relay coils 25, and thence through conductor 79 to the opposite terminal 80 of the battery 75. Thus, as soon as the amount of film on reel 3 brings together the adjacent contact fingers 5 and 6, the relay 25 will be energized and will retract the latch pin 27 and result in the movable plate 21 being restored to neutral position.

In order that the operator may stop the motor and the winding of the film at any time, a switch 81, preferably of the push button type, is connected across the conductors 76 and 78, so that whenever the circuit is closed at the push button switch 81, the current will flow through conductor 76, switch 81 and conductor 78 to the relay coils, and thence through the conductor 79 to the opposite terminal of the battery.

To cause the motor to rotate in the reverse direction, so that the film will be wound up on reel 2 instead of on reel 3, it is first necessary to stop the motor if it is rotating, and then to depress the other plunger 41, so as to bring the terminals $e'$, $f'$, $g'$ and $h'$ in contact with the terminals $e$, $f$, $g$ and $h$. In this event, the latch pin 27 will engage against the opposite side of the lug 30. In this adjustment of the switch, the armature circuit for the motor is as follows: Terminal 60, conductor 61, terminal $a'$, across through terminal 82 to terminal $e'$, terminal $e$, across through conductor 83 to terminal $a$, and thence, as before, through the armature of the motor to the supply terminal 67.

The motor field circuit will be reversed and will be as follows: from conductor 63 to terminal $c'$ and across through conductor 84 to terminal $g'$ and terminal $g$, across through conductor 85 to terminal $b$, and thence through conductors 73 and 72 to the field terminal 71. From the opposite field terminal 70, the current will pass through conductors 69 and 68 to terminal $c$, thence across through conductor 86 to terminal $f$, and from terminal $f'$ through conductor 87 to terminal $b'$, and thence through conductor 74 to the opposite terminal 67 of the source of supply. Similarly, in this adjustment of the switch, the relay 25 will be energized when the contacts 5 and 6 adjacent the reel 2 are brought together by the film on this reel. In this case, current from the battery 75 will pass from terminal 74' through conductor 76, through contacts 5 and 6 adjacent the reel 2, through conductor 88 to terminals $h$ and $h'$, thence through conductor 89 across to terminal $d'$ and conductor 78 to the relay, from whence the current passes through conductor 79 to the opposite pole of the battery.

The relay circuit, including the switch 81, will not be altered, and the motor when rotating to drive the reel 2 may be stopped at any time by merely closing the circuit at the switch 81, as before.

From the above, it will be apparent that the control is simple, automatic and efficient. Moreover, it will be apparent that good and firm electrical contact is insured between the terminals of the rotating switch, and that any tendency to arc when the circuits are broken at the switch terminals is minimized. The switch may be constructed in a very simple and compact manner and, therefore, there is no difficulty in mounting it on any machine with which it may be used.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:—

1. In a switch of the character described, in combination, two sets of cooperating electrical terminals arranged in adjacent parallel planes, one set being rotatable with respect to the other set into and out of contact with terminals of the other set selectively, resilient means operative to move said rotatable carrier in either direction to normally maintain the terminals thereon in out of contact position with the terminals of the other carrier, means for latching the rotatable set of terminals in various positions with respect to the other set, and electro-magnetic means operative when energized to release said latching means.

2. In a switch of the character described, in combination, a pair of carriers for electrical terminals, two cooperating sets of electrical terminals, one set on each carrier, one carrier being rotatable with respect to the other carrier, means for rotating the rotatable carrier to place the terminals thereon in and out of contact selectively with terminals on the other carrier, means normally positioning the rotatable plate where there is no contact between said sets of terminals, and certain terminals of the sets being positioned to come into contact upon rotation of said plate in one direction from said position and other terminals of the sets being positioned to come into contact upon rotation of said plate in the opposite direction from said position of no contact.

3. In a switch of the character described, in combination, a pair of carriers for electrical terminals, two cooperating sets of electrical terminals, one set on each carrier, one carrier being rotatable with respect to the other carrier, means for rotating the rotatable carrier to place the terminals thereon in and out of contact selectively with terminals on the other carrier, and latch means for locking the rotatable carrier in different positions establishing contact between different selective terminals of the two sets, and spring means for automatically moving said carrier in either direction out of contact with the terminals on the other carrier.

4. In a switch of the character described, in combination, a pair of carriers for electrical terminals, two cooperating sets of electrical terminals, one set on each carrier, one carrier being rotatable with respect to the other carrier, means for rotating the rotatable carrier to place the terminals thereon in and out of contact selectively with terminals on the other carrier, latch means for locking the rotatable carrier in different positions establishing contact between different selective terminals of the two sets, and electro-magnetic means for tripping the latch means to release the rotatable carrier for movement out of said positions, said movement of the rotatable carrier rendering said electro-magnetic means inactive.

5. In a switch of the character described, in combination, a pair of carriers for electrical terminals, two cooperating sets of electrical terminals, one set on each carrier, one carrier being rotatable with respect to the other carrier, means for rotating the rotatable carrier to place the terminals thereon in and out of contact selectively with terminals on the other carrier, latch means for locking the rotatable carrier in different positions establishing contact between different selective terminals of the two sets, and spring means for automatically moving said carrier in either direction, when released from said latch, into a position in which no terminals of the sets are in contact with each other.

6. In a switch of the character described, in combination, a pair of carriers for electrical terminals, two cooperating sets of electrical terminals, one set on each carrier, one carrier being rotatable with respect to the other carrier, means for rotating the rotatable carrier to place the terminals thereon in and out of contact selectively with terminals on the other carrier, latch means for locking the rotatable carrier in different positions establishing contact between different selective terminals of the two sets, electro-magnetic means for tripping the latch means to release the rotatable carrier for movement out of said positions, and spring means for automatically moving said carrier in either direction, when released from said latch, into a position in which no terminals of the sets are in contact with each other.

7. A switch for controlling the operation of an electric device including, in combination, a pair of carriers for electrical terminals, two cooperating sets of electrical terminals, one set on each carrier, an electro-magnetic device for locking said terminals in contact position, and means for rotating one carrier with respect to the other to place some of said terminals thereon in and out of contact with certain terminals on the other carrier to control the current flow to said electric device and to place the other of said contact points in and out of contact with certain contact points on the other carrier to control the current flow to said electro-magnetic latching device.

8. A switch for controlling the operation of an electric device including, in combination, a pair of carriers for electric terminals adapted to be operatively connected to said electric device in such a manner that rotation of one of said carriers with respect to the other will cause said electric device to operate in one direction and rotation of said carrier in the opposite direction will cause said electric device to reverse its operative direction, a pivoted anchor shaped member having its stem portion in operative contact with said rotatable carrier, and means adapted to engage each arm of said anchor shaped member to rock said anchor member and rotate said carrier in either direction.

9. A switch for controlling the operation of an electric motor, said switch comprising carriers for electric terminals operatively connected to the motor in such a manner that the manipulation of one of said carriers with respect to the other will place said carriers in operative contact and said motor in operative position, electro-magnetic means operative to maintain said carriers in operative contact, and means operative to withdraw said electro-magnetic means from said carrier to permit it to swing into non-contact position at predetermined times.

This specification signed this 15th day of September, 1926.

HARRY E. CHIPMAN.